June 9, 1953

C. E. BARKALOW ET AL 2,641,133

CAGING DEVICE FOR ATTITUDE GYROSCOPES

Filed Nov. 9, 1951

INVENTORS
CLARE E. BARKALOW
THOMAS A. EARLY, JR.
BY
Herbert H. Thompson
their ATTORNEY

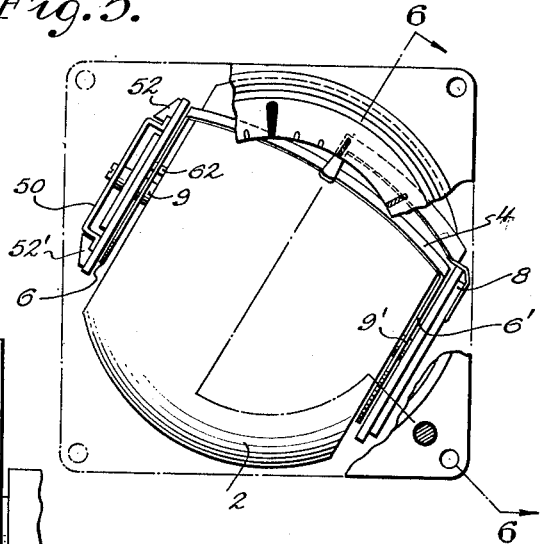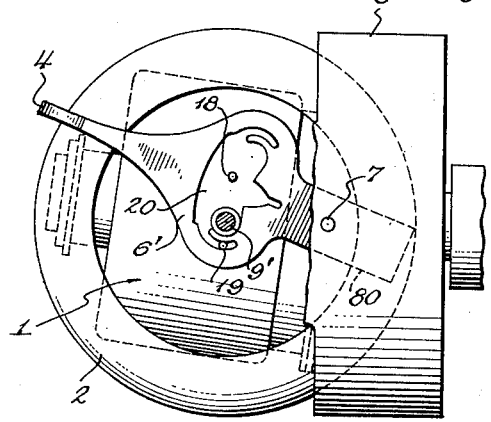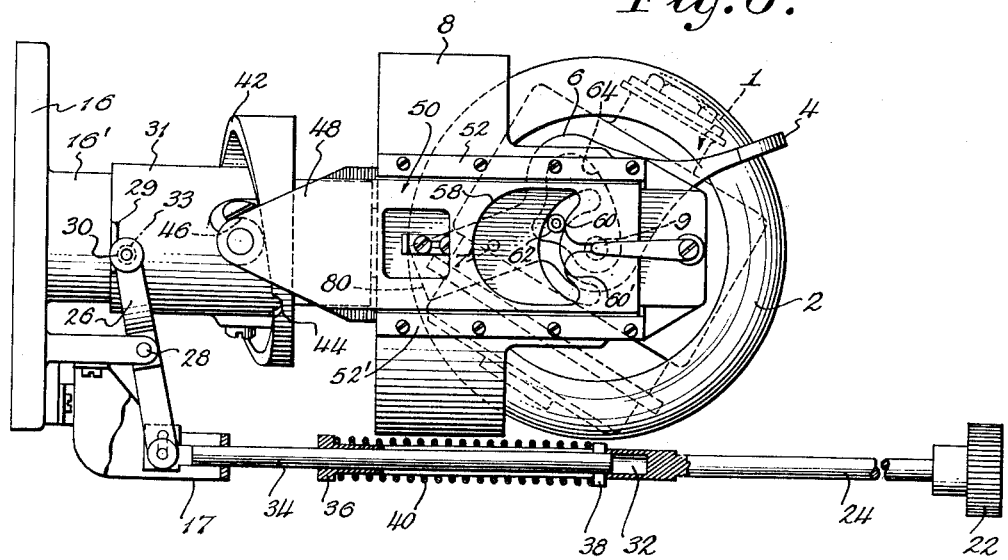

Patented June 9, 1953

2,641,133

UNITED STATES PATENT OFFICE 2,641,133

CAGING DEVICE FOR ATTITUDE GYROSCOPES

Clare E. Barkalow, Huntington, and Thomas A. Early, Jr., Sea Cliff, N. Y., assignors to The Sperry Corporation, a corporation of Delaware Application November 9, 1951, Serial No. 255,662

5 Claims. (Cl. 74—5.1)

This invention relates to caging mechanisms for gyroscopic instruments, especially to airplane instruments of the artificial horizon, gyro vertical or attitude types. Such gyroscopes are now given complete freedom about one axis and freedom up to almost 180 degrees about the other axis, so that many of the forms of cages heretofore used are not satisfactory for this type of gyroscope.

An object of the invention is to devise a cage preferably for manual operation which will quickly lock and centralize the gyroscope about both its horizontal axes simultaneously and which at no time will exert an excessive torque or cause excessive gyroscopic torques to be exerted on the bearings.

A further object of the invention is to improve the construction of gyroscopic artificial horizons of this type and especially the mounting of the horizon bar itself.

Referring to the drawings in which a preferred form of my invention is shown,

Fig. 5 is a face view of the attitude gyroscope in a tilted attitude, with the outer case partly broken away;

Fig. 6 is a view similar to Fig. 1 with the parts of the cage in the caging position, and certain parts being shown in section taken approximately on line 6—6 of Fig. 5; and Fig. 7 is a detail side view of the horizon bar and its actuating means, viewed from the opposite side from Fig. 6.

Figure 1:
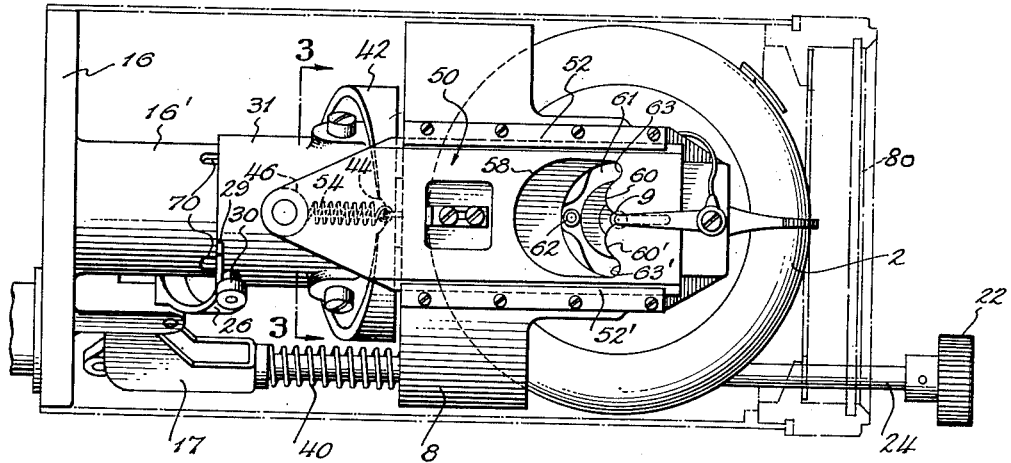
Fig. 1 is a side view of an attitude gyroscope with my improved cage applied thereto, the outer casing being shown in dotted lines.
Figure 2:
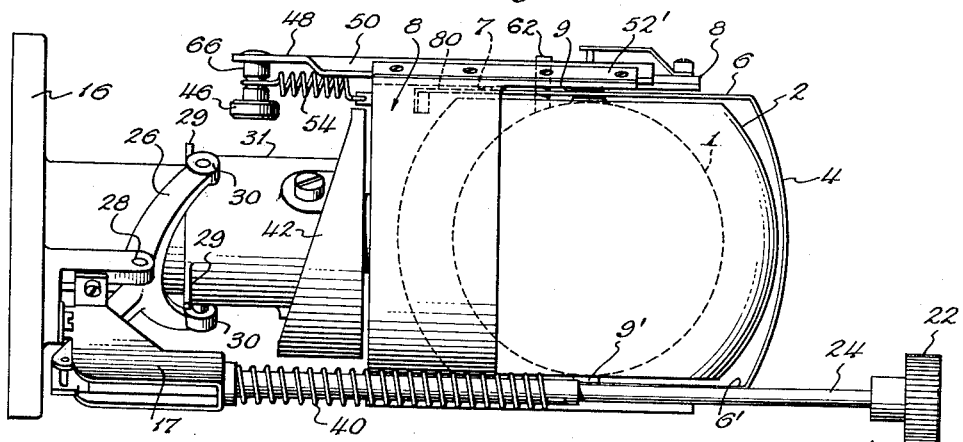
Fig. 2 is a bottom plan view thereof.
Figure 4:
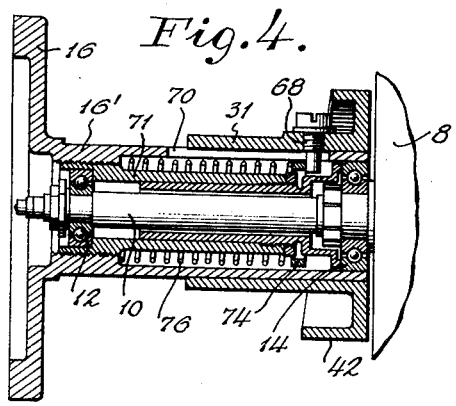
Fig. 4 is a cross section taken approximately on broken line 4—4 of Fig. 3.
Figure 3:
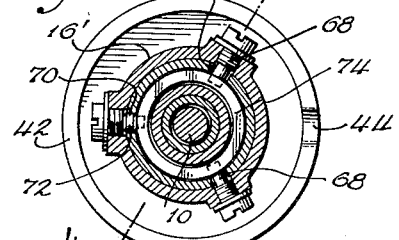
Fig. 3 is a cross section taken along line 3—3 of Fig. 1.

My cage is shown as applied to a form of artificial horizon usually referred to as an attitude gyroscope, in which the gyro casing 1 of the vertical gyroscope is housed within a truncated sphere 2 of sheet metal and the horizon is indicated by a normally horizontal cross bar 4 across the face of the instrument, which rises and falls and becomes inclined to simulate the apparent movements of the real horizon when the craft pitches and rolls. The bar is shown as extending completely across the face of the instrument and is pivoted by means of U-shaped rearward extensions or legs 6, 6' on bearings 7 to the rear of the transverse axis 9, 9' pivoting the gyro case 1 within the U-shaped gimbal 8. The gimbal ring in turn is pivoted about a fore-and-aft axis by means of a long trunnion 10 at the rear thereof journaled in spaced bearings 12 and 14 within a sleeve 16' extending from the fixed frame 16. Since the bar is mounted on the gimbal, it will roll with the gimbal and up and down motion (reverse to that of sphere 2) is imparted thereto, preferably by means of pins 18 and 19 (Fig. 7) projecting from the gyro case and passing through a specially shaped slot 20 in an elongated portion of the leg 6' of the bar. This actuating mechanism is shown more in detail in the prior patent to E. F. Aumuller, No. 2,485,552, dated October 25, 1949, for Gyroscopic Artificial Horizon, but other types may also be employed. By it the bar never leaves the field of view through the front window 80 regardless of the pitch angle.

On the opposite side of the gyroscope, I provide my special locking means or caging device (Figs. 1 and 6). This comprises essentially a knob 22 mounted on an extensible shaft 24 slidably mounted in fixed framework 17 and connected at its inner end to a forked link 26 pivoted at 28 on said frame and abutting at its upper end 30 through a roller 33, a stop plate 29 on a slidable sleeve 31 so as to slide the same to the left in Fig. 1 when the knob is pulled to the right. In other words, the sleeve 31 is moved from the position shown in Fig. 1 to the position shown in Fig. 6 when the knob is pulled to the right and is returned upon release of the knob to the Fig. 1 position by a spring 76 as hereinafter described. Preferably, the rod 24 is made in two parts by making the inner end of the rod 24 in the form of a tube 32 which fits over the second part 34 of the rod. Such tube is provided with a collar 36 and between the collar and the cross pin 38 fixed in the inner end of rod 34 is held a compression spring 40. By this means, the force that can be exerted at any time on the gyro, is limited to the stiffness of the spring.

The sleeve 31 is provided at its inner end with a cam 42 of which the camming surface extends around the sleeve in the form of an inclined track having a notch 44 therein. Cooperating with said cam or trackway is a friction roller 46 extending inwardly from an extension 48 on a slide 50. Said slide is mounted in upper and lower trackways 52, 52' on one arm of gimbal 8 and is normally held to the right in Figs. 1 and 6 by tension spring 54. Said slide also has an opening 58 therein having especially shaped cam surfaces 60, 60'. When this slide is moved to the left (see Fig. 6) these surfaces engage a pin 62 projecting from the gyro casing through an arcuate slot 64 in the enlarged hub portion of the leg 6 of bar 4. This has the effect, as shown in Fig. 6, of forcing the pin 62 downwardly to its central position as shown in dotted lines, where the pin enters and is trapped between the central depression between cam surfaces 60 and 60'; thus caging and centralizing the gyro about its pitch axis. Pin 62 also extends through an arcuate slot 61 in the gimbal ring, said slot terminating at points 63, 63' which limit the tilt of the gyro about its athwartship axis 9, 9' to a few degrees less than 90 degrees in each direction.

At the same time, engagement of the roller 46 with track 42 tends to rotate the U-shaped gimbal 8 in bearings 12, 14 so as to cage the gyro simultaneously about its roll axis, about which no stops are provided. Preferably, the roller 46 is clamped tight enough in its mounting pin 66 so that it has sufficient frictional engagement with the track 42 to exert a rotating effect on the gyro about fore and aft bearings 12 and 14 about equal to the rotating effect around the pitch axis of the gyro exerted by the engagement of the cam surfaces 60, 60' with the pin 62. In other words, the gyro is caged simultaneously about both its normally horizontal axes and the cage is operative regardless of the inclination of the gyro.

Sleeve 31 is prevented from turning as by means of a plurality of set screws 68 which project inwardly therefrom through slots 70 in the elongated fixed bearing 16' extending from a main casting 16 in supporting bearings 12, 14. At least one of said pins is provided with a roller 72 rolling in its trackway 70. All the pins also extend inwardly beyond the trackway so that their inner ends engage a ring 74 which furnishes an abutment for the inner end of the compression spring 76 located within a circular recess between sleeve 16' and thimble 71 supporting the outer bearing race of bearing 12. The outer end of said spring bears against the outer end of said recess so as to yieldingly hold the sleeve 31 to the right and therefore hold the cam normally out of engagement with the locking roller 46 and leaving the gyro free. When, however, the knob 22 is pulled to the right, the cam is moved against compression spring 76 so that the trackway 42 engages the roller 46 and performs the function of caging the gyro simultaneously about both axes, as described. The tension on the knob 22 is maintained until the roller engages the notch 44 and the pin 62 is within the depression between 60 and 60' so that the gyro is then locked or caged.

It should be noted also that the mounting of my horizon bar is different from, and an improvement over that shown in said Aumuller patent, in which the horizon bar has one end free. According to my construction, I extend both ends of the horizon bar so as to furnish a pivot 7, 7' at both ends so that vibration of the same due to a free end is prevented. The bar and its rearward extensions are also balanced about each pivot 7, 7' by counterbalancing extensions 80, so that independent, symmetrical balancing of each half of the bar is secured and any distortion of the bar due to acceleration forces is eliminated. The cam pin action, however (parts 18, 19 and 20), for actuating the bar 4 may be identical with that shown in Aumuller and is fully described therein.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A caging device for a gyroscope having a gimbal mounting the same for freedom about major and minor axes comprising a slide mounted on said gimbal and having movement along the major axis thereof, a pin on said gyroscope projecting through a slot in said gimbal and an aperture in said slide, a cam surface within said aperture for engaging said pin to centralize the gyroscope about its minor axis as said slide is moved away from its normal position, a slidably mounted annular cam surface fixed against rotation and also adapted to be moved along said major axis away from its normal position, means on said slide engaging said surface when it is so moved to both move the slide away from its normal position and to rotate said gimbal to centralize the gyroscope about such major axis, whereby said gyroscope is centralized about both major and minor gimbal axes simultaneously.

2. A caging device for gyroscopes as claimed in claim 1 having a knob, means interconnecting said knob and cam surface to move the same along said major axis, and a spring in said interconnections between said knob and surface whereby excessive pressure on said surface is prevented and limited to the stiffness of the spring.

3. A gyroscope of the attitude type for aircraft comprising a U-shaped gimbal, a trunnion and bearing at the closed side of the U, mounting the gyro for freedom about a major axis, trunnions pivoting said gyro in said gimbal about a minor axis, an annular cam member slidably but non-rotatably mounted on said bearing, a slider mounted on said gimbal having a cam engaging member thereon engaged by said member upon displacement thereof and to rotate and cage said gyro about its major axis upon linear displacement of said cam member and camming means interengaging said slide and gyro for also caging the gyro about its minor axis upon linear displacement of said slider due to displacement of said cam member.

4. An attitude type gyro for aircraft having a gimbal ring, a bearing at the rear side only of said gimbal, mounting the same for freedom about the fore and aft axis of the craft, said gimbal being U-shaped, a gyroscope mounted in said gimbal on a transverse axis, a horizon bar pivoted to said U-shaped gimbal on each side of said gyroscope inside of said gimbal and to the rear of said transverse axis, said horizon bar having a slot in each leg thereof, through which the transverse trunnions of the gyro extend, said gyro also having a pin at one side thereof extending through one of said slots to actuate said bar on relative pitch of the gyroscope and airplane, and said gyro also having a pin on the opposite side thereof extending through said other slot, and a caging cam on said gimbal adapted to engage said pin for caging the gyro.

5. An attitude type gyro for aircraft having a gimbal ring, a bearing at the rear side only of said gimbal, mounting the same for freedom about the fore and aft axis of the craft, said gimbal being U-shaped, a gyroscope mounted in said gimbal on a normally transverse axis, a horizon bar pivoted to said U-shaped gimbal on each side of said gyroscope inside of said gimbal and to the rear of said transverse axis, said horizon bar having an extension beyond each of said pivot points whereby symmetrical balance of each half of the bar is secured and said bar also having a slot in each leg thereof, through which the transverse trunnions of the gyro extend, said gyro also having a pin at one side thereof extending through one of said slots to actuate said bar on relative pitch of the gyroscope and airplane, and said gyro also having a pin on the opposite side thereof extending through said other slot, and a caging cam on said gimbal adapted to engage said pin for caging the gyro.

CLARE E. BARKALOW.
THOMAS A. EARLY, Jr.

References Cited in the file of this patent

UNITED STATES PATENTS

| Number | Name | Date |
| --- | --- | --- |
| 2,059,266 | Nesbitt | Nov. 3, 1936 |
| 2,468,016 | Konet | Apr. 19, 1949 |
| 2,491,813 | Jordan | Dec. 20, 1949 |
| 2,524,745 | Adkins | Oct. 10, 1950 |